United States Patent Office 3,795,735
Patented Mar. 5, 1974

3,795,735
ANTIMICROBIAL NITROIMIDAZOLYL-1,2,4-OXADIAZOLES
Goro Asato, Titusville, and Gerald Berkelhammer, Princeton, N.J., assignors to American Cyanamid Company, Stamford, Conn.
No Drawing. Original application Dec. 8, 1969, Ser. No. 883,236, now Patent No. 3,658,832. Divided and this application Jan. 10, 1972, Ser. No. 216,800
Int. Cl. A61k 27/00
U.S. Cl. 424—248
3 Claims

ABSTRACT OF THE DISCLOSURE

The disclosure describes novel 5-substituted-3-(1-substituted - 5 - nitro - 2 - imidazolyl) - 1,2,4 - oxadiazoles and 5 - substituted-3-(1-substituted-5-nitro-2-imidazolyl)-$\Delta^2$-1,2,4-oxadiazolines, their method of preparation and use in treating bacterial and protozoal infections in warm-blooded animals.

This is a divisional application of our copending application Ser. No. 883,236, filed Dec. 8, 1969, now U.S. Pat. No. 3,658,832.

DESCRIPTION OF THE INVENTION

This invention relates to nitroimidazolyloxadiazoles or oxadiazolines and their preparation. More particularly, it relates to novel compounds of the formulae:

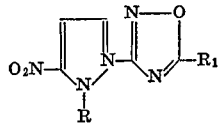

or

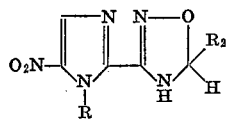

wherein R is loweralkyl, hydroxyloweralkyl, loweralkanoyloxylower alkyl, or aroyloxyloweralkyl; $R_1$ is hydrogen, lower alkyl, hydroxy, trichloromethyl, amino, mono-lower alkylamino, diloweralkylamino, mono(hydroxyloweralkyl)amino, di(hydroxyloweralkyl)amino, piperidino, 1-pyrrolidinyl, morpholino, lower alkanoylamino, haloloweralkanoylamino or dihaloloweralkanoylamino; and $R_2$ is loweralkyl, with the proviso that when $R_1$ is trichloromethyl then R is lower alkyl, loweralkanoyloxyloweralkyl, or aroyloxyloweralkyl.

In accordance with the present invention and as employed in the instant specification and claims, the term "loweralkyl" means a straight or branched chain loweralkyl radical having 1 to 4 carbon atoms. The terms "hydroxyloweralkyl" and "haloloweralkyl" means a straight or branched chain loweralkyl group of 1 to 4 carbon atoms substituted with hydroxy or one halogen group such as chloro, bromo, fluoro or iodo and "dihaloloweralkyl" is the same except that there are two halo substituents, either the same or different. The term "aroyl" is intended to include benzoyl, monohalobenzoyl, dihalobenzoyl, loweralkylbenzoyl, diloweralkylbenzoyl, 4-nitrobenzoyl, methoxybenzoyl and naphthoyl. The term "halo" is intended to include fluorine, chlorine, bromine and iodine and "dihalophenyl" describes a phenyl substituted with two halogens which are either the same or different. Similarly, the term "diloweralkylphenyl" describes a phenyl substituted with two identical or different alkyl groups, either straight or branched chain and having from 1 to 4 carbon atoms. The hydroxy, amino, and mono-substituted amino oxadiazoles may be present in tautomeric forms which are also intended to be within the scope of the present invention.

The oxadiazoles of the present invention having the formula:

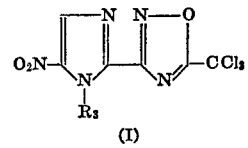

where $R_3$ is loweralkyl, loweralkanoyloxyloweralkyl or aroyloxyloweralkyl can be prepared by reacting a 1-loweralkyl or 1 - loweralkanoyloxyloweralkyl-5-nitro-2-imidazolecarboxamidoxime with trichloroacetic anhydride, at a temperature between about 50° and 130° C., in the presence of trichloroacetic acid. Treatment of the thus prepared product with a compound of the formula: $HR_1$ where $R_1$ is amino, loweralkylamino, hydroxyloweralkylamino, diloweralkylamino, di(hydroxyloweralkyl)amino, piperidino, 1-pyrrolidinyl or morpholino then yields a compound of the formula:

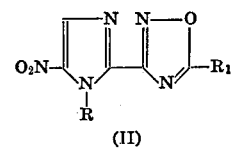

wherein R is loweralkyl, hydroxyloweralkyl, loweralkanoyloxyloweralkyl or aroyloxyloweralkyl and $R_1$ is amino, loweralkylamino, hydroxyloweralkylamino, diloweralkylamino, di(hydroxyloweralkyl)amino, piperidino, 1-pyrrolidinyl or morpholino. Generally these reactions are carried out in the presence of a solvent such as a loweralkanol under ambient conditions or at a somewhat elevated temperature, for example, between about 40° and 80° C. However, in some instances, it is preferable to use the amines in excess without solvent at a temperature within the range of about 0° C. to 100° C. for a period of from about 0.5 to 2 hours. In the case of Formula I compounds where $R_3$ is loweralkanoyloxyloweralkyl or aroyloxyloweralkyl the acyloxy group will frequently be removed in whole or in part by treatment with the amine, affording Formula II compounds where R is hydroxyloweralkyl or mixtures of such compounds with Formula II compounds where R is loweralkanoyloxyloweralkyl or aroyloxyloweralkyl. Where the acyloxyalkyl group remains intact, the acyl group may be removed by hydrolysis to give Formula II compounds where R is hydroxyloweralkyl.

These reactions may be graphically illustrated as follows:

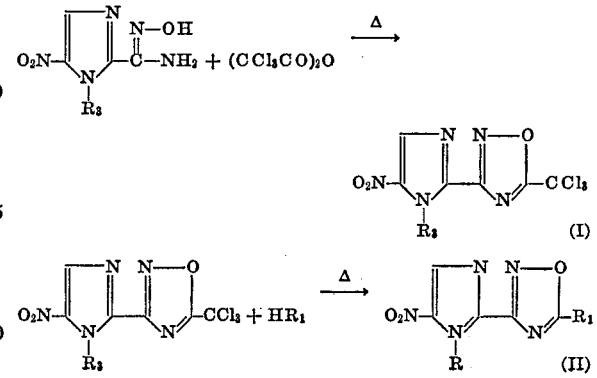

wherein R, $R_1$ and $R_3$ are as hereinbefore defined. Alternative methods of preparing compounds of Formula II, where $R_1$ is amino are exemplified by the following equations:

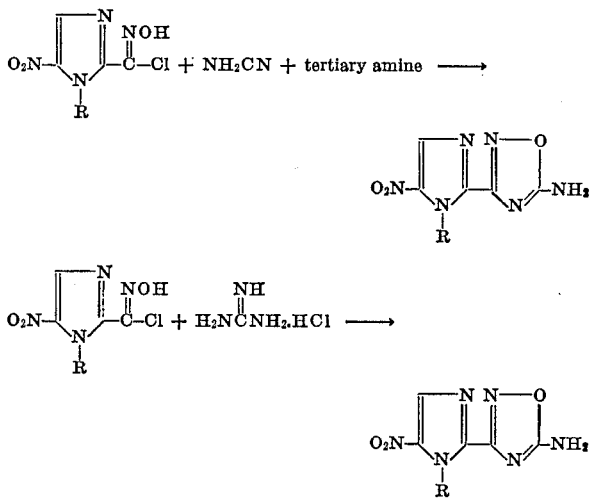

wherein $R_1$ is as hereinbefore defined.

Where it is desirable to obtain Formula II compounds in which $R_1$ is

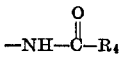

and $R_4$ is loweralkyl, haloloweralkyl or dihaloloweralkyl, a 5-amino compound of Formula II is treated with an anhydride of the formula: $(R_4CO)_2O$ where $R_4$ is as described above, at an elevated temperature between about 50° and 100° C.

Formula II compounds in which $R_1$ is hydrogen can be prepared by heating to reflux temperature a mixture of an alkyl orthoformate and an imidazolecarboxamidoxime of the formula:

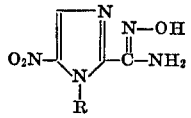

where R is as described above. Use of loweralkyl ortho-loweralkyl carboxylates or of loweralkanoic acid anhydrides in place of the alkyl orthoformate gives Formula II compounds wherein $R_1$ is loweralkyl.

Lastly, Formula II compounds in which $R_1$ is hydroxyl, are prepared from the O-alkyl carbonate of an imidazolecarboxamidoxime and an alkali metal salt of a loweralcohol. The reaction is preferably carried out in an alcoholic solvent and at a temperature between about 50° C. and 150° C.

Further, other oxadiazoles of the type having the formula:

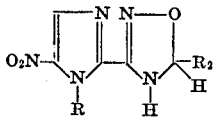

where R is as previously described and $R_2$ is lower alkyl are readily prepared by reacting an imidazolecarboxamidoxime of the formula:

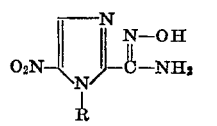

wherein R is as previously described, with a loweralkyl aldehyde at a temperature generally between 50° and 150° C.

The compounds of the invention are useful as antimicrobial agents, particularly antiprotozoal and antibacterial agents, for warm-blooded animals including farm, laboratory and domestic animals, such as horses, sheep, cattle, swine, poultry, rabbits, guinea pigs and dogs.

The novel compounds may be used in solid or liquid form and can be administered either orally or parenterally. They may be administered in the feed or drinking water of the animal receiving treatment or can be given as tablets, capsules, pills, boluses, drenches or by subcutaneous or intramuscular injection.

When administered in a single or oral dose these compounds are generally effective at from about 10 to 1000 mg./kg. of host body weight and preferably at from 25 to 5000 mg./kg. Multiple dose administered over a period of from several days to several months are usually effective when administered at a lower dosage for example, from about 25 to 200 mg./kg. of body weight or when included in the diet at a concentration of about 0.01 to 1.0%.

DETAILED DESCRIPTION

The following examples describe in detail the preparation of nitroimidazole oxadiazoles of this invention and method of testing these compounds as antimicrobial agents. A number of intermediates used are described and claimed in our copending application Ser. No. 883,237, filed Dec. 8, 1969, now U.S. Pat. No. 3,658,838.

EXAMPLE 1

Preparation of 3-(1-methyl-5-nitro-2-imidazolyl)-5-trichloromethyl-1,2,4-oxadiazole A solution which contains 15.2 g. (0.1 mole) of 2-cyano-1-methyl-5-nitroimidazole which may be prepared by the procedure described in U.S. Pat. 3,341,549, filed July 8, 1963, in 100 ml. of ethanol is heated to reflux temperature with a mixture of 6.95 g. (0.1 mole) of hydroxylamine hydrochloride and 5.6 g. (0.1 mole) of potassium hydroxide in 300 ml. of 95% ethanol. After 10 minutes, the mixture is cooled, and the yellow 1-methyl-5-nitro-2-imidazolecarboxamidoxime is collected, washed with water and dried. The yield is 15.7 g. (85%), melting point 238–240° C.

A mixture of 8.8 g. (0.0475 mole) of 1-methyl-5-nitro-2-imidazolecarboxamidoxime and 31 g. (0.19 mole) of trichloroacetic acid is heated to 90° C. to afford a solution and 29.4 g. (0.095 mole) of trichloroacetic anhydride is gradually added as the temperature is kept at 80–100° C. with a water bath. After the addition is completed, the mixture is heated to 110–120° C. and kept at this temperature for 15 minutes. The solution is cooled to 80° C., poured on ice, stirred well, and the aqueous mixture is made slightly alkaline with solid sodium bicarbonate. The undissolved solid is dissolved in 100 ml. of chloroform, which is added to the aqueous mixture. To this is added 25 ml. of saturated, aqueous sodium bicarbonate solution, and the two phases are shaken before they are separated. The aqueous layer is extracted further with two 25 ml. portions of chloroform, and the combined chloroform solutions are dried over magnesium sulfate, decolorized with activated carbon; and evaporated to dryness under reduced pressure to afford an oil, which crystallizes. The yield is 13.5 g. (91%) and the 3-(1-methyl-4-nitro-2-imidazolyl)-5-trichloromethyl-1,2,4-oxadiazole melts at 80–85° C.

EXAMPLE 2

Preparation of 3-[1-(2-acetoxyethyl)-5-nitro-2-imidazolyl] - 5 - trichloromethyl-1,2,4-oxadiazole and 3-[1-benzoyloxyethyl) - 5-nitro-2-imidazoyl]-5-trichloromethyl-1,2,4-oxadiazole In the manner described in Example 1, 1-(2-acetoxyethyl-5-nitro-2-imidazolecarboxamidoxime is allowed to react with trichloroacetic anhydride in trichloroacetic acid to give 3-[1-(2-acetoxyethyl)-5-nitro-2-imidazolyl]-

5-trichloromethyl-1,2,4-oxadiazole, melting point 107–109° C.

In the same fashion, 1-(2-benzoyloxyethyl)-5-nitro-2-imidazolecarboxamidoxime is allowed to react with trichloroacetic anhydride in trichloroacetic acid to give 3-[1-(2-benzoyloxyethyl)-5-nitro-2-imidazolyl]-5-trichloromethyl-1,2,4-oxadiozole.

EXAMPLE 3

Prepartion of 3-(1-ethyl-5-nitro-2-imidazolyl)-5-trichloromethyl-1,2,4-oxadiazole The method described in Example 1 is used to prepare 3-(1-ethyl-5-nitro-2-imidazolyl)-5-trichloromethyl-1,2,4-oxadiazole, melting point 85°–86.5° C., by starting with 1-ethyl-5-nitro-2-imidazolecarboxamidoxime.

Similarly, when 1-(n-propyl)-5-nitroimidazolecarboxamidoxime is allowed to react with trichloroacetic anhydride in trichloroacetic acid, 3-(1-propyl-5-nitroimidazolyl)-5-trichloromethyl-1,2,4-oxadiazole is obtained.

EXAMPLE 4

Preparation of 5-amino-3-(1-methyl-5-nitro-2-imidazolyl)-1,2,4-oxadiazole

Ammonia is bubbled into a solution which contains 8 g. (0.026 mole) of 3-(1-methyl-5-nitro-2-imidazolyl)-5-trichloromethyl-1,2,4-oxadiazole in 200 ml. of methanol at 60° C. The ammonia addition is terminated 5 minutes after solid formation occurs. The mixture is stirred for an additional 15 minutes at 55–60° C. and allowed to cool overnight. The mixture is then cooled to 0° to −10° C., and the off-white solid is collected and washed with cold methanol. The yield of 5-amino-3-(1-methyl-5-nitro-2-imidazolyl)-1,2,4-oxadiazole is 4.78 g., melting point 292–293° C.

EXAMPLE 5

Preparation of 5-methylamino-3-(1-methyl-5-nitro-2-imidazolyl)-1,2,4-oxadiazole

Methylamine is bubbled into a methanol solution which contains 3-(1-methyl-5-nitro-2-imidazolyl)-5-trichloromethyl-1,2,4-oxadiazole, in the manner described in Example 4 to afford 5-methylamino-3-(1-methyl-5-nitro-2-imidazolyl)-1,2,4-oxadiazole, melting point 267–269° C.

EXAMPLE 6

Preparation of 5-dimethylamino-3-(1-methyl-5-nitro-2-imidazolyl)-1,2,4-oxadiazole In the manner described in Example 4, 3-(1-methyl-5-nitro-2-imidazolyl)-5-trichloromethyl-1,2,4-oxadiazole is allowed to react with dimethylamine to give 5-dimethylamino-3-(1-methyl-5-nitro-2-imidazolyl)-1,2,4-oxadiazole, melting point 193–195° C.

EXAMPLE 7

Preparation of 5-amino-3-(1-ethyl-5-nitro-2-imidazolyl)-1,2,4-oxadiazole

In the manner described in Example 4, 3-(1-ethyl-5-nitro-2-imidazolyl)-5-trichloromethyl-1,2,4-oxadiazole is allowed to react with ammonia to afford 5-amino-3-(1-ethyl-5-nitro-2-imidazolyl)-1,2,4-oxadiazole, melting point 208–210° C. (dec.).

In accordance with the above procedure, the substitution of ammonia by methylamine, dimethylamine, and methylpropylamine affords, respectively, 5-methylamino-3-(1-ethyl-5-nitro-2-imidazolyl)-1,2,4-oxadiazole, 5-dimethylamino-3-(1-ethyl-5-nitro-2-imidazolyl)-1,2,4-oxadiazole, and 5-methylpropylamino-3-(1-ethyl-5-nitro-2-imidazolyl)-1,2,4-oxadiazole.

EXAMPLE 8

Preparation of 5-amino-3-[1-(2-acetoxyethyl)-5-nitro-2-imidazolyl]-1,2,4-oxadiazole Using the procedure described in Example 4, 3-[1-(2-acetoxyethyl)-5-nitro-2-imidazolyl]-5-trichloromethyl-1,2,4-oxadiazole is allowed to react with ammonia at room temperature to afford a mixture of 5-amino-3-[1-(2-acetoxyethyl)-5-nitro-2-imidazolyl]-1,2,4-oxadiazole, and 5-amino-3-[1-(2-hydroxyethyl)-5-nitro-2-imidazolyl]-1,2,4-oxadiazole which is separated by recrystallization. In the above manner, when methylamine and dimethylamine, respectively, are substituted for ammonia, 5-methylamino and 5-dimethylaino-3-[1-(2-acetoxyethyl)-5-nitro-2-imidazolyl]-1,2,4-oxadiazoles are obtained along with their corresponding deacetylated oxadiazoles.

EXAMPLE 9

Preparation of 5-amino-3-[1-(2-hydroxyethyl)-5-nitro-2-imidazolyl]-1,2,4-oxadiazole Method A.—A mixture of 0.5 g. of 5-amino-3-[1-(2-acetoxyethyl)-5-nitro-2-imidazolyl]-1,2,4-oxadiazole, 5 ml. of ethanol and 2 ml. of 6 N hydrochloric acid is heated to reflux for 5 minutes, cooled and neutralized with saturated sodium bicarbonate solution to give 5-amino-3-[1-(2-hydroxyethyl)-5-nitro-2-imidazolyl]-1,2,4-oxadiazole, which is collected by filtration. The latter compound melts at 210–212° C. (dec.).

In the same manner, hydrolysis of 5-dimethylamino- and 5-methylamino-3-[1-(2-acetoxyethyl)-5-nitro-2-imidazolyl]-1,2,4-oxadiazoles afford 5-dimethylamino- and 5-methylamino-3-[1-(2-hydroxyethyl)-5-nitro-2-imidazolyl]-1,2,4-oxadiazoles, respectively, and hydrolysis of 5-amino-3-[1-(2-benzoyloxyethyl)-5-nitro-2-imidazolyl]-1,2,4-oxadiazole giving 5-amino-3-[1-(2-hydroxyethyl)-5-nitro-2-imidazolyl]-1,2,4-oxadiazole.

Method B.—A methanol solution of 3-[1-(2-acetoxyethyl)-5-nitro-2-imidazolyl]-5-trichloromethyl-1,2,4-oxadiazole is allowed to react with excess ammonia at reflux temperature for 3 hours and cooled to afford 5-amino-3-[1-(2-hydroxyethyl)-5-nitro-2-imidazolyl]-1,2,4-oxadiazole, melting point 210–212° (dec.).

The same starting oxadiazole under the same conditions with dimethylamine and methylamine affords 5-dimethyl- and 5-methylamino-3-[1-(2-hydroxyethyl)-5-nitro-2-imidazolyl]-1,2,4-oxadiazoles, respectively; and when 3-[1-(2-benzoyloxyethyl)-5-nitro-2-imidazolyl]-5-trichloromethyl-1,2,4-oxadiazole is allowed to react with ammonia under the same conditions, there is obtained 5-amino-3-[1-(2-hydroxyl)-5-nitro-2-imidazolyl]-1,2,4-oxadiazole.

EXAMPLE 10

Preparation of 5-amino-3-[1-(n-propyl)-5-nitro-2-imidazolyl]-1,2,4-oxadiazole

A methanol solution which contains 3-[1-(n-propyl)-5-nitro-2-imidazolyl]-5-trichloromethyl-1,2,4-oxadiazole is treated with ammonia in the manner described in Example 4 to afford 5-amino-3-[1-(n-propyl)-5-nitro-2-imidazolyl]-1,2,4-oxadiazole.

In accordance with above procedure, substitution of methylamine and dimethylamine for ammonia, respectively, afford 5-methylamino- and 5-dimethylamino-3-[1-(n-propyl)-5-nitro-2-imidazolyl]-1,2,4-oxadiazoles.

EXAMPLE 11

Preparation of 3-(1-methyl-5-nitro-2-imidazolyl)-$\Delta^2$-1,2,4-oxadiazoline-5-one A mixture of 5.1 g. of (0.028 mole) of a 1-methyl-5-nitro-2-imidazolecarboxamidoxime and 4.35 g. (0.055 mole) of pyridine is heated to reflux temperature in 100 ml. of tetrahydrofuran (THF) and 3.8 g. (0.035 mole) of ethyl chloroformate in 20 ml. of THF, is added. A white precipitate forms rapidly and after 2 hours, the mixture is cooled, filtered and the filter cake is washed with THF. The filtrate is evaporated to dryness under reduced pressure to give a solid, which is washed with water and collected. The solid is recrystallized from acetone-hexane to give 1-methyl-5-nitro-2-imidazolecarboxamidoxime, O-(ethylcarbonate) melting at 139°–140° C.

A mixture of 14.8 g. (0.058 mole) of 1-methyl-5-nitro-2-imidazolecarboxamidoxime, O-(ethylcarbonate) prepared above, and 1.48 g. (0.0274 mole) of sodium methylate in 425 ml. of 1-propanol is heated at 80–95° C. for 3.5 hours. The mixture is cooled to about 40° C., filtered and the filter cake is washed with cold 1-propanol. The collected solid is dissolved in water and the resulting solution is acidified with 5-hydrochloric acid until a pH of 4 is attained. The tan solid, which forms during acidification, is collected, washed with water, and dried to give 3-(1-methyl-5-nitro-2-imidazolyl)-$\Delta^2$-1,2,4-oxadiazolin-2-one.

Additional product is obtained by adding 1.63 g. of sodium methylate to the mother liquor and heating to 96° C., and repeating the workup procedure. The total yield is 6.6 g. (54%), melting point 239°–241° C.

In accordance with the above procedure, 3-[1-(2-acetoxyethyl)-5-nitro-2-imidazolyl]-$\Delta^2$-1,2,4 - oxadiazolin - 5-one is prepared from 1-(2-acetoxyethyl)-5-nitro-2-imidazolecarboxamidoxime, O-(ethylcarbonate), and 3-(1-ethyl-5-nitro-2-imidazolyl)-$\Delta^2$-1,2,4-oxadiazolin-5-one is prepared from 1-ethyl-5-nitro-2-imidazolecarboxamidoxime, O-(ethylcarbonate).

EXAMPLE 12

Preparation of 3-[1-(2-hydroxyethyl)-5-nitro-2-imidazolyl]-$\Delta^2$-1,2,4-oxadiazolin-5-one A mixture of 1 g. of 3-[1-(2-acetoxyethyl)-5-nitro-2-imidazolyl]-$\Delta^2$-1,2,4-oxadiazolin-5-one, 5 ml. of ethanol and 1 ml. of 6 N hydrochloric acid is refluxed for 15 minutes, cooled, and neutralized with aqueous sodium bicarbonate to afford the title compound.

EXAMPLE 13

Preparation of 5-methyl-3-(1-methyl-5-nitro-2-imidazolyl)-$\Delta^2$-oxadiazoline A mixture of 8.34 g. (0.19 mole) of acetaldehyde and 5.86 g. (0.0316 mole) of 1-methyl-5-nitro-2-imidazolecarboxamidoxime is heated to reflux temperature for 5.5 hours, cooled, and the yellow crystals are collected and washed with ether. The filtrate and ether wash are evaporated to dryness and the residue is washed with ether to afford additional product. The combined crops (5.28 g. of 82.8%) of 5-methyl-3-(1-methyl-5-nitro-2-imidazolyl)-$\Delta^2$-1,2,4-oxadiazoline melt at 126–128° C.

Substitution of acetaldehyde with butyraldehyde in the above procedure affords 5-propyl-3-(1-methyl-5-nitro-2-imidazolyl)-$\Delta^2$-1,2,4-oxadiazoline.

EXAMPLE 14

Preparation of 5-methyl-3-[1-(2-hydroxyethyl)-5-nitro-2-imidazolyl]-$\Delta^2$-1,2,4-oxadiazoline A solution of 2-cyano-1-(2-hydroxyethyl)-5-nitroimidazole is reacted with an equimolar quantity of hydroxylamine and the product 1-(2-hydroxyethyl)-5-nitro-2-imidazolecarboxamidoxime is collected as a precipitate.

A mixture of 8.3 g. acetaldehyde and 6 g. of 1-(2-hydroxyethyl) - 5 - nitro-2-imidazolecarboxamidoxime (prepared above) is heated to reflux temperature for 6 hours, cooled, and evaporated to dryness. The residue is swirled with ether and the insoluble 5-methyl-3-[1-(2-hydroxyethyl)-5-nitro-2-imidazolyl]-$\Delta^2$-1,2,4-oxadiazoline is collected.

In the above manner, acetaldehyde and butyraldehyde, respectively, with 1-ethyl-5-nitro-2-imidazolecarboxamidoxime afford 5-methyl- and 5-propyl-3-(1-ethyl-5-nitro-2-imidazolyl)-$\Delta^2$-1,2,4-oxadiazolines. Substitution of 1-ethyl-5-nitro-2-imidazolecarboxamidoxime with 1-(2-acetoxyethyl) - 5 - nitro - 2 - imidazolecarboxamidoxime gives 5-methyl- and 5-propyl-3-[1-(2-acetoxyethyl)-5-nitro-2-imidazolyl]-$\Delta^2$-1,2,4-oxadiazolines.

EXAMPLE 15

Preparation of 3-(1-methyl-5-nitro-2-imidazolyl)1,2,4-oxadiazole

A mixture of 5.55 g. (0.03 mole) of 1-methyl-5-nitro-2-imidazolecarboxamidoxime and 30 ml. of ethyl orthoformate is heated at reflux temperatures for 3.5 hours, cooled in an ice bath, filtered, and the insoluble product is washed with about 75 ml. of cold ether to afford 3.05 g. The filtrate is evaporated to dryness and the residue is heated at reflux temperature with 12 ml. of additional ethyl orthoformate. The above workup is used and an additional 1.15 g. of product is obtained. The combined crops of 3 - (1 - methyl-5-nitro-2-imidazolyl)-1,2,4-oxadiazole melt at 148–151° C.

Using the above procedure, 1-(2-acetoxyethyl)-5-nitro-2-imidazolecarboxamidoxine, 1 - (2 - benzoyloxyethyl)-5-nitro - 2 - imidazolecarboxamidoxime, 1-ethyl-5-nitro-2-imidazolecarboxamidoxime, 1-(n-propyl)-5-nitro-2-imidazolecarboxamidoxime, respectively, afford 3-[1-(2-acetoxyethyl)-, 3 - [1 - (2 - benzoyloxyethyl)-, 3-[(1-ethyl)-, 3 - [1 - (n-propyl) - 5 - nitro - 2 - imidazolyl]-1,2,4,-oxadiazoles. Mild acid hydrolysis of the 1-(2-acetoxyethyl)- and the 1-(2-benzoyloxyethyl)- compound gives 3-[1-(2-hydroxyethyl)-5-nitro-2-imidazolyl]-1,2,4-oxadiazole.

EXAMPLE 16

Preparation of 5-acetamido-3-(1-methyl-5-nitro-2-imidazolyl)-1,2,4-oxadiazole

A mixture of 0.21 g. of 5-amino-3-(1-methyl-5-nitro-2-imidazolyl)-1,2,4-oxadiazole and 2.1 ml. of acetic anhydride to heat at reflux temperature for 2.5 hours, cooled, and evaporated to dryness under reduced pressure to afford the above compound, which is collected and washed with ether. The title compound is recrystallized from 95% ethanoldimethylformamide, melting point 237–241° C.

In the above manner, 5-dichloroacetamido- and 5-monochloroacetamido - 3 - (1 - methyl - 5 - nitro-2-imidazolyl)-1,2,4-oxadiazoles are obtained by substituting dichloroacetic anhydride and monochloracetic anhydride, respectively, for acetic anhydride.

EXAMPLE 17

Preparation of 5-piperidino-3-(1-methyl-5-nitro-2-imidazolyl)-1,2,4-oxadiazole

Method A.—In the manner described in Example 4, 1 g. of 3-(1-methyl-5-nitro-2-imidazolyl)-5-trichloromethyl-1,2,4-oxadiazole in 20 ml. of methanol is allowed to react with 1 g. of piperidine to product the title compound, melting point 129–131° C. (after recrystallization of 95% ethanol).

Method B.—The title compound is prepared by adding 9.4 g. of 3-(1-methyl-5-nitro-2-imidazolyl)-5-trichloromethyl-1,2,4,-oxadiazole to 50 ml. of piperidine and stirring for 55 minutes. The mixture is cooled in an ice bath, diluted with 95% ethanol and the insoluble title compound is collected to give 6.3 g., melting point 119–128° C.

EXAMPLE 18

Preparation of 5-morpholino-3-(1-methyl-5-nitro-2-imidazolyl)-1,2,4-oxadiazole

Using the procedure described in Example 17, Method B, a large excess of morpholine and 3-(1-methyl-5-nitro-2 - imidazolyl) - 5 - trichloromethyl-1,2,4-oxadiazole are allowed to react to afford the above compound, melting point 186–189° C.

EXAMPLE 19

Preparation of 5-(1-pyrrolidinyl)-3-(1-methyl-5-nitro-2-imidazolyl)-1,2,4-oxadiazole When the procedure described in Example 17, Method B, is used and an excess of pyrrolidine and 3-(1-methyl-5- nitro-2-imidazolyl)-5-trichloromethyl-1,2,4-oxadiazole are allowed to react the above compound is obtained.

EXAMPLE 20

Preparation of 5-(2-hydroxyethylamino)-3-(1-methyl-5-nitro-2-imidazolyl)-1,2,4-oxadiazole An excess of ethanolamine and 3-(1-methyl-5-nitro-2-imidazolyl) - 5 - trichloromethyl-1,2,4-oxadiazole are allowed to react as in Example 17, Method B, yielding the title compound, melting point 198–200° C.

EXAMPLE 21

Preparation of 5-methyl-3-(1-methyl-5-nitro-2-imidazolyl)-1,2,4-oxadiazole

Method A.—In the manner described in Example 15, 1-methyl-5-nitro-2-imidazolecarboxamidoxime and ethyl orthoacetate are heated to reflux temperature to afford 3 - methyl - 5 - (1-methyl-5-nitro-2-imidazolyl)-1,2,4-oxadiazole.

Similarly, 3-ethyl - 5 - (1-methyl-5-nitro-2-imidazolyl)-1,2,4-oxadiazole is prepared by substituting methyl orthopropionate for ethyl orthoformate.

Also, in the above manner, 1-ethyl-, 1-(2-acetoxyethyl), and 1-(n-butyl)-5-nitro-2-imidazolecarboxamidoxime and ethyl orthopropionate afford 5-(1-ethyl-, 5-[1-(2-acetoxyethyl)-, and 5-[1-(n-butyl)-5-nitro-2-imidazolyl]-3-ethyl-1,2,4-oxadiazole, respectively. Mild acid hydrolysis of 5 - [1 - (2 - acetoxyethyl) - 5 - nitro-2-imidazolyl]-3-ethyl-ethyl - 1,2,4 - oxadiazole gives 5-[1-(2-hydroxyethyl)-5-nitro-2-imidazolyl]-3-ethyl-1,2,4-oxadiazole.

Method B.—A mixture of 0.2 g. of 1-methyl-5-nitro-2-imidazolecarboxamidoxime in 5 ml. of acetic anhydride is refluxed for 3.25 hours, evaporated to dryness under reduced pressure and swirled in ether. The insoluble tan solid is collected and washed with ether. Recrystallization from aqueous ethanol affords yellow needles of 5-methyl-3-(1-methyl - 5 - nitro-2-imidazolyl)-1,2,4-oxadiazole, melting point 118–120° C.

Similarly, 5 - ethyl-3-(1-methyl-5-nitro-2-imidazolyl)-1,2,4-oxadiazole and 5-ethyl-3-[1-(2-acetoxyethyl)-5-nitro-2-imidazolyl]-1,2,4-oxadiazole are prepared by allowing 1-methyl and 1-(2-hydroxyethyl)-5-nitro-2-imidazolecarboxamidoxime to react with propionic acid anhydride.

EXAMPLE 22

Preparation of 5-amino-3-[1-(2-benzoyloxyethyl)-5-nitro-2-imidazolyl]-1,2,4-oxadiazole The procedures of Example 8, using 3-[1-(2-benzoyloxyethyl)-5-nitro-2-imidazolyl]-5-trichloromethyl - 1,2,4-oxadiazole yields 5-amino-, 5-methylamino-, and 5-dimethylamino-3-[1 - (2-benzoyloxyethyl)-5-nitro-2-imidazolyl]-1,2,4-oxadiazole as mixtures with the corresponding debenzoylated products. The mixtures are separated by recrystallization.

EXAMPLE 23

Preparation of 5-amino-3-(1-methyl-5-nitro-2-imidazolyl)-1,2,4-oxadiazole

A mixture of 0.1 g. of 1-methyl-5-nitro-2-imidazolecarbonyl chloride oxime, 0.1 g. of cyanamide, and 5 drops of triethylamine in 3 ml. of methanol is refluxed for 15 minutes, cooled, and the title product is collected by filtration. The crude material is washed with cold methanol and dried to give 0.02 g. of 5-amino-3-(1-methyl-5-nitro-2-imidazolyl)-1,2,4-oxadiazole.

EXAMPLE 24

Preparation of 5-amino-3-(1-methyl-5-nitro-2-imidazolyl)-1,2,4-oxadiazole

A mixture of 0.47 g. (5 mmole) of guanidine hydrochloride in 5 ml. ethanol is stirred while 0.27 g. (5 mmole) of sodium methylate in 3 ml. of ethanol is added as a paste. To this is added 0.51 g. (2.5 mmole) of 1-methyl-5-nitro-2-imidazolecarbonyl chloride oxime in 7 ml. of ethanol, and stirring is continued at room temperature for 2.5 hours. The mixture is then refluxed 0.5 hour and evaporated to dryness under reduced pressure to give a brown residue. Water is added to the residue and the insoluble solid is collected. Recrystalization of this material from ethanol affords 5-amino-3-(1-methyl-5-nitro - 2 - imidazolyl)-1,2,4-oxadiazole, melting point 268° C. The pure product melts at 286.5–289° C., (dec.).

EXAMPLE 25

Utilization of compounds of the present invention in controlling *Trichomonas vaginalis* infections Mice are inoculated with 50,000 culture-derived *Trichomonas vaginalis* (Thoms strain). Test compounds are administered in a single oral dose by gavage one day after inoculation. Six days of post-inoculation scrapings, from the subcutaneous sites of inoculation, are searched microscopically for motile trichomonads, and antitrichomonal activity is concluded to be present in these instances where motile trichomonads are eliminated from lesions present at the site of inoculation. Mouse body weight gain from day 1 to day 6 post-inoculation shows that the compounds of the invention are well tolerated by the animals ingesting same. Data obtained are tabularized below.

TABLE I

| Compound | Dose | Total mice tested | Cleared | Percent cleared |
|---|---|---|---|---|
| 5-methyl-3-(1-methyl-5-nitro-2-imidazolyl)-1,2,4-oxadiazole | 100 | 20 | 19 | 95 |
|  | 50 | 10 | 10 | 100 |
|  | 25 | 10 | 5 | 50 |
| 3-(1-methyl-5-nitro-2-imidazolyl)-1,2,4-oxadiazole | 50 | 20 | 20 | 100 |
|  | 25 | 30 | 25 | 83 |
| 3-(1-methyl-5-nitro-2-imidazolyl)-$\Delta^2$-1,2,4-oxadiazolin-5-one | 100 | 20 | 15 | 75 |
| 3-(1-methyl-5-nitro-2-imidazolyl)-5-trichloromethyl-1,2,4-oxadiazole | 100 | 15 | 15 | 100 |
|  | 50 | 10 | 10 | 100 |
|  | 25 | 10 | 10 | 100 |
| 5-amino-3-(1-methyl-5-nitro-2-imidazolyl)-1,2,4-oxadiazole | 10 | 15 | 13 | 87 |

EXAMPLE 26

Testing mice against the infection *Trypanosoma equiperidum*

Female albino mice are inoculated intraperitoneally with approximately 100,000 *Trypanosoma equiperdum*. Test compound is administered once, two to four hours post-inoculation. The dosage is based on average mouse weight obtained just before treatment and is corrected for acid or base content. Regimen which results in survival of 50% or more of the mice for 14 days post-inoculation is considered highly suppressive. Mortality of infected untreated controls in this test is typically greater than 99%. The following table summarizes the results of the tests:

TABLE II

| Compound | Dose, 100 mg./kg./gavage (number of protected/number tested) |
|---|---|
| 5-amino-3-(1-methyl-5-nitro-2-imidazoly)-1,2,4-oxadiazole | 3/5 |

NOTE.—Dose is in terms of percentage by weight of the feed composition.

The diet used in these tests in Ralston Purinas Commercial Laboratory Mouse Chow.

EXAMPLE 27

Utilization of compounds of the present invention in controlling fowl typhoid

Groups of one-day old sex-linked pullet chicks are infected orally by gavage with 0.5 ml. of a $10^{-2}$ dilution of a five-hour Trypticase Soy Broth culture of *Salmo-*

*nella gallinarum*, the causative agent of fowl typhoid. Each chick received approximately 6 ×10⁵ viable cells. Medication is administered continuously in the feed, beginning 3 hours before infection and continuing for 10 days, at which time the test is terminated and the number of survivors in each group recorded. The results are compared with two control groups of chicks, the first group comprising 20 chicks which are infected and untreated, and the second group comprising 10 chicks which are uninfected and untreated.

The results of the test are set forth in the following table:

TABLE III

| Compounds: | Dose | Total chicks tested | Survivors |
|---|---|---|---|
| 5-methyl-3-(1-methyl-5-nitro-2-imidazolyl)-1,2,4-oxadiazole | 0.1 | 10 | 4 |
| 5-amino-3-(1-methyl-5-nitro-2-imidazolyl)-1,2,4-oxadiazole | 0.1 | 10 | 10 |
|  | 0.025 | 10 | 10 |
| 5-methylamino-3-(1-methyl-5-nitro-2-imidazolyl)-1,2,4-oxadiazole | 0.1 | 10 | 10 |
|  | 0.025 | 10 | 6 |
| 5-dimethylamino-3-(1-methyl-5-nitro-2-imidazolyl)-1,2,4-oxadiazole | 0.1 | 10 | 9 |
|  | 0.025 | 10 | 3 |
| 5-(2-hydroxyethylamino)-3-(1-methyl-5-nitro-2-imidazolyl)-1,2,4-oxadiazole | 0.1 | 10 | 9 |
| 5-acetamido-3-(1-methyl-5-nitro-2-imidazolyl)-1,2,4-oxadiazole | 0.1 | 5 | 5 |
| Infected—Untreated |  | 20 | 0 |
| Uninfected—Untreated |  | 10 | 10 |

NOTE.—Dose is in terms of percentage by weight of the feed composition.

CHICK DIET EMPLOYED

Component: Percent
- Ground yellow corn _____ 51.4
- Soybean oil meal solvent (44%) _____ 30.0
- Menhaden fish meal (60%) _____ 5.0
- Corn gluten metal (41%) _____ 5.0
- Dehydrated alfalfa meal (17%) (100,000 A) __ 2.0
- Stabilized fat _____ 4.0
- Dicalcium phosphate _____ 1.2
- Ground calcite limestone (33% Ca) _____ 0.5
- Sodium chloride _____ 0.3
- Trace minerals (Delamix plus 2% zinc) which comprises 6% manganese, 2% iron, 2% zinc, 0.2% copper, 0.12% cobalt and from 26% to 31% calcium _____ 0.1
- Vitamin-amino acid premix _____ 0.5

VITAMIN AMINO ACID PREMIX

Component: Amount per. kg. feed
- BHT (butylated hydroxy toluene) ___ 125 gm.
- DL-Methionine _____ 500 mg.
- Vitamin A _____ 3300 I.U.
- Vitamin D₃ _____ 1100 I.C.U.
- Vitamin E _____ 2.2 I.U.
- Vitamin B₁₂ _____ 1'1 mcg.
- Riboflavin _____ 4.4 mcg.
- Niacin _____ 27.5 mg.
- Pantothenic acid _____ 8.8 mg.
- Choline chloride _____ 500 mg.
- Folic acid _____ 1.43 mg.
- Menadione sodium bisulfite _____ 1.1 mg.
- Ground yellow corn _____ To 5 grams.

EXAMPLE 28

Utilization of compounds as amoebicides

Compounds of this invention show activity as amoebicides. Activities are measured by means of an assay devised from W. R. Jones, "The Experimental Infection of Rats With *Entamoeba histolytica*; With A Method for Evaluating the Anti-Amoebic Properties of New Compounds," Annals of Tropical Medicine and Parasitology, Volume 40, pp. 130–140 (1946).

The test organism is *Entamoeba histolytica* (NIH 200). Cultures are maintained on Cleveland Collier liver infusion medium with serum saline 1:1 overlay in 3x5 test tube slants. Rice powder is added as a growth factor. Cultures are transferred at five day intervals and kept at 37° C. A 48 hour culture is used for the test inoculum and harvested the morning of the test by collecting the sediment containing rice powder and amoebae found at the junction of the butt and the salt. The amoebae are counted and the amount of inoculum for injection is adjusted to contain approximately 200,000 to 250,000 amoebae. Female Wistar strain albino rats from the Royal Hart Farms weighing 20 to 35 grams are used. The cecum is exposed during laparotomy and the amoebae-rich inoculum is injected into the anterior section. The incision is closed with autoclips. Procedures are sterile throughout the course of the surgery. The infected rats are divided randomly into groups of 10. Treatment is begun on the day of infection. Drugs are premixed in a standard laboratory feed sold under the trademark Purina Lab. Chow by the Ralston Purina Company. The ingredients of this commercial feed are meat and bone meal, dried skimmed milk, wheat germ meal, fish meal, animal liver meal, dried beet pulp, ground extruded corn, oat middlings, soybean meal, dehydrated alfalfa meal preserved with ethoxyquin, cane molasses, animal fat preserved with BHA, vitamin B₁₂ supplement, calcium pantothenate, choline chloride, folic acid riboflavin supplement brewers' dried yeast, thiamine, niacin, vitamin A supplement, D activated plant sterol, vitamin E supplement, dicalcium phosphate, iodized salt, ferric ammonium citrate, iron oxide, manganeous oxide, cobalt carbonate, copper oxide, zinc oxide. Rats are maintained on the drug diet for five days at the end of which they are necropsied and the cecum examined macroscopically for pathologic feature of infection and microscopically for the presence of amoebae. Scores of one each are recorded for evidences of mucous, fibrosis, and lesions or inflammation. A score of one is recorded for a finding of 1–20 amoeba and a score of 2 for a finding of more than 20 amoeba on a standard slide preparation. Total score of 0–5, thus, is possible per rat at necropsy. The arithmetic mean of the combined average degree of infection (ADI) in a test or control group of rats is considered to be the group ADI. Activities are expressed in percentage of suppression of group ADI of a test group to the group ADI or a control group. Consumption of test compound is determined from the weight of feed consumed.

TABLE IV.—INTESTINAL AMEBIASIS IN RATS

| Compound | Percent drug concentration in diet | Approximately mg./kg./day for 5 days | Percent suppression of A.D.I.[1] |
|---|---|---|---|
| 5-methyl-3-(1-methyl-5-nitro-2-imidazolyl)-³²-1,2,4-oxadiazoline | 0.025 | 34 | 74 |
| 3-(1-methyl-5-nitro-2-imidazolyl)-1,2,4-oxadiazole | 0.025 | 29 | 68 |

[1] Percent suppression of the average degree of infection relative to the untreated control A.D.I.—

Abbott's formula = (Untreated control ADI − Treated ADI × 100) / Untreated control ADI NOTE.—Criterion of activity=50% or more suppression of ADI.

We claim:

1. A method for controlling bacterial infections in warm-blooded animals comprising orally or parenterally administering to said animals a bactericidally or bacteristatically effective amount of a nitroimidazolyloxadiazole or oxadiazoline of the formulae:

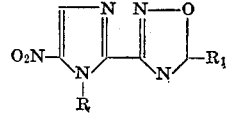

or

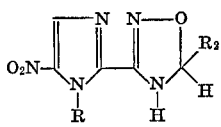

wherein R is lower alkyl, hydroxyloweralkyl, or loweralkanoyloxyloweralkyl; $R_1$ is hydrogen, loweralkyl, hydroxy, trichloromethyl, amino, monoloweralkylamino, diloweralkylamino, monohydroxyloweralkylamino, di(hydroxyloweralkyl)amino, piperidino, 1-pyrrolidinyl, morpholino, loweralkanoylamino, haloloweralkanoylamino or dihaloloweralkanoylamino; $R_2$ is loweralkyl, with the proviso that when $R_1$ is trichloromethyl, then R is loweralkyl, or loweralkanoyloxyloweralkyl.

2. A method according to claim 1, wherein the nitroimidazolyloxadiazole or oxadiazoline is orally or parenterally administered at from 10 to 200 mg./kg. of body weight.

3. A method for controlling protozoal infections selected from the group consisting of Trichomonas, Entamoeba and Tryponosoma in warm-blooded animals comprising orally or parenterally administering to said animals a protozoacidal or protozoastatic amount of a nitroimidazolyloxadiazole or oxadiazoline of the formulae:

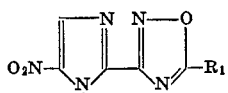

wherein R is loweralkyl, hydroxyloweralkyl, or loweralkanoyloxyloweralkyl, $R_1$ is hydrogen, loweralkyl, hydroxy, trichloromethyl, amino, monoloweralkylamino, diloweralkylamino, monohydroxyloweralkylamino, di(hydroxyloweralkyl)amino, piperidino, 1-pyrrolidinyl, morpholino, loweralkanoylamino, haloloweralkanoylamino or dihaloloweralkyanoylamino; $R_2$ is loweralkyl, with the proviso that when $R_1$ is trichloromethyl, then R is loweralkyl, or loweralkanoyloxyloweralkyl.

References Cited
UNITED STATES PATENTS
| | | | |
|---|---|---|---|
| 3,658,832 | 4/1972 | Asato et al. | 424—272 |
| 3,575,998 | 4/1971 | Christensen et al. | 424—272 |
| 3,608,082 | 9/1971 | Redin | 424—272 |

OTHER REFERENCES
Chemical Abstracts, vol. 70, (1969), p. 87694w.

SAM ROSEN, Primary Examiner

V. D. TURNER, Assistant Examiner

U.S. Cl. X.R.

424—267, 272